2,854,418

CYCLIC AMINE DEFOAMANT

Roy T. Edwards, Roslyn, and Ernst P. Rittershausen, Hempstead, N. Y., assignors to Socony Mobil Oil Company, Inc., a corporation of New York No Drawing. Application December 13, 1955
Serial No. 552,704

4 Claims. (Cl. 252—358)

The present invention relates to the suppression or inhibition of the formation of foam. It is more particularly concerned with materials that suppress the formation of foam in aqueous media, such as those of sewage disposal plants.

In the operation of steam boilers it has been customary to treat the water with basic materials in order to prevent the formation of corrosion. Such treatment, however, renders the feed water decidedly alkaline and frequently imparts to it tendencies to form excessive amounts of foam. In sewage disposal plants, on the other hand, the aqueous media are decidedly acidic or at least substantially neutral. In other words, the pH of the aqueous media in such plants is never greater than 7, whereas, on the other hand, the pH of boiler feed waters is decidedly greater than 7. Yet, quite often the aqueous media having a pH lower than 7 will have a tendency to foam. This is particularly noticeable in modern sewage disposal plants because of the increased use of household detergents. In such cases, the acidic sewage disposal liquors have a marked tendency to produce large amounts of foam. It will be recognized that such foaming impairs the efficient operation of the disposal plants. It will be appreciated, therefore, that it is highly desirable to provide a means of inhibiting or suppressing the formation of foam in operations that involve the use of aqueous media having a pH less than 7, such as in sewage disposal plants.

In the treatment of boiler feed waters, there have been proposed many methods for suppressing the formation of foam in the boiler tubes. On the other hand, the treatment of acidic aqueous media, such as encountered in sewage disposal plants, is a relatively new problem. Insofar as is now known, no methods of treatment have been advanced for suppressing the formation of foam in aqueous media having a pH lower than about 7.

It has now been found that the formation of foam in aqueous media having a pH less than 7 can be suppressed simply and economically. It has been discovered that such foaming can be suppressed by adding to the aqueous media small amounts of a defoamant comprising a carrier and a combination of a nonionic surface active agent and a rosin amine.

Accordingly, it is an object of this invention to provide a defoamant for the suppression of foam in aqueous media having a pH less than 7. Another object is to provide a means for suppressing the formation of foam in modern sewage disposal plants. A specific object is to provide a defoamant for suppressing the formation of foam in aqueous media having a pH less than 7, that comprises rosin amine, a nonionic surface active agent, and a carrier therefor. Other objects and advantages of this invention will become apparent to those skilled in the art from the following detailed description.

In general, the present invention provides a composition for suppressing foam in aqueous media having a pH not greater than 7 which comprises a carrier containing rosin amine and a nonionic surface active agent in definite proportions.

The amine utilizable in the present invention is a primary amine obtained from rosin acids. In general, the amines are produced by converting the rosin acids into the corresponding nitrile and reducing them to primary amines. Accordingly, the rosin amine contemplated herein can contain one or more of the following amines, namely, dehydroabietyl amine, dihydroabietyl and tetrahydroabietyl amine. Particularly useful in the present invention is a rosin amine that is commercially available as "Hercules Rosin Amine D." According to the manufacturer, this material has the following structure:

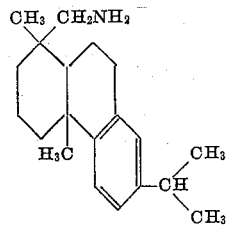

The surface active agent utilizable in the foam suppressant compositions of this invention are of the nonionic type, i. e., surface active agents that are not dependent upon ionization for their surface active properties. Many such materials are well known to those skilled in the art. Preferred surface active agents are the polyoxyethylene ethers of octylphenol that have the following general structural formula:

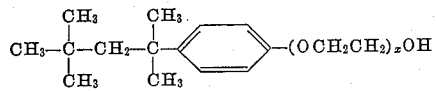

wherein $x$ is an integer varying between about 5 and about 13. Another type includes the mono fatty acid esters of polyethylene glycol having the general formula:

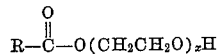

wherein R is an aliphatic radical having between about 11 and about 17 carbon atoms and $x$ is an integer varying between about 5 and about 50. Preferably, R will be 17 and $x$ will be 10. Still another class of surface active agent utilizable herein are the fatty acid esters of sorbitan, such as sorbitan monooleate.

The carrier utilizable in the composition of the present invention is a material in which the rosin amine is soluble but which is substantially immiscible with water. A generally preferred carrier is a mineral oil of lubricating viscosity, preferably a mineral oil fraction having a Saybolt Universal viscosity of between about 30 and about 200 at 100° F. Other materials can be used that in themselves are not good defoamants, such as a mixture of alcohols, propylene glycol, alkylene glycol, ketones, esters, Butyl-Cellosolve and Butyl Carbitol, and the like.

Another component that can be used in the defoamant composition of this invention is a haze eliminator. In general, the materials utilizable as such are the fatty acids. Oleic acid is generally preferred, although other acids, such as caprylic and linoleic acids are contemplated. It must be understood, however, that the primary function of the haze eliminator is to induce greater customer appeal. Accordingly, the haze eliminator can be omitted where this is not a consideration.

As has been mentioned hereinbefore, the amounts of rosin amine and of nonionic surface active agent used in the defoamant of this invention are critical in relation to each other. The amount of rosin amine will vary between about 2 weight percent and about 50 weight percent. The amount of nonionic surface active agent must be between about 0.1 weight percent and about 0.5 weight percent. It has been found that if the nonionic surface active agent is used in greater concentrations than 0.5 weight percent, emulsion difficulties occur which interfere with the defoamant action. On the other hand, some surface active agent must be present in order to achieve good defoamant action. It is important, however, that the ratio of the amount of surface active agent to the amine must be between about 0.01 and about 0.05.

The haze eliminator, if used, can be present in an amount varying between about 1 weight percent and about 50 weight percent. The balance of the formulation will be the carrier, such as mineral oil.

The following specific examples are for the purpose of illustrating the defoamant compositions of this invention and of exemplifying the specific nature thereof. It is to be strictly understood, however, that this invention is not to be limited by the particular additives or to the operations and manipulations described therein. Other materials, as discussed hereinbefore, are utilizable, as those skilled in the art will readily appreciate.

For the determination of the effectiveness of defoamant formulations used in aqueous environments having a pH less than 7, such as those of sewage plants, the following testing method has been found to be correlative with commercial scale operations. Twenty milliliters of an aqueous solution containing about 0.05 weight percent of a foam-producing agent, such as Nacconol NR are placed in a 100 milliliter graduated stoppered cylinder. One drop (approximately 0.05 milliliter) of the defoamant is added. The cylinder is then stoppered and shaken at the rate of one shake per second for a one minute period. Immediately after the shaking is stopped, the initial reading is taken. This reading is the total volume of liquid plus foam that is present in this cylinder. Subsequent readings are then taken at intervals of 10, 20, 30 and 60 seconds after the shaking operation has been stopped. Any defoamant that produces less than about 40 milliliters total volume of liquid and foam in this test is a satisfactory defoamant for use in acidic environments, such as those of sewage disposal plants.

EXAMPLE 1

A defoamant blend was prepared that contained 5 weight percent rosin amine, 5 weight percent oleic acid, 0.25 weight percent of a polyoxyethylene ether of octyl phenol having the following structure

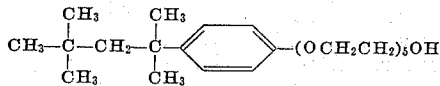

and 89.75 weight percent mineral oil having a Saybolt Universal viscosity of 100 seconds at 100° F. This material was subjected to the defoamant test. Pertinent results are set forth in Table I.

EXAMPLE 2

For comparison purposes a blend was prepared that contained 5 weight percent oleic acid, 0.25 weight percent of the polyoxyethylene ether of octyl phenol described in Example 1 and 94.75 weight percent of the mineral oil described in Example 1. This formulation is the same as the formulation described in Example 1 with the rosin amine omitted. This material was tested in the defoamant test and pertinent results are set forth in Table I.

EXAMPLE 3

For further purposes of comparison, the mineral oil alone without additives was subjected to the defoamant test. The results of this test are also reported in Table I.

*Table I*

| Time (seconds) | Total volume of foam+liquid, ml. | | |
|---|---|---|---|
| | Example 1 | Example 2 | Example 3 |
| 0 | 21 | 41 | 51 |
| 10 | 21 | 41 | 53 |
| 20 | 20 | 41 | 53 |
| 30 | 20 | 40 | 53 |
| 60 | 20 | 40 | 53 |

It will be apparent from the data in Table I that the defoamant composition of this invention completely eliminated foaming in less than 20 seconds. When the amine was eliminated, defoamant action was very poor. The carrier alone also gave poor defoamant action.

EXAMPLE 4

The defoamant composition described in Example 1 was used in a full scale operation in a sewage disposal plant. The defoamant composition was introduced into the sewage at the rate of 1 gallon per hour with the flow of sewage at about 2.6 million gallons per hour. The foaming of the sewage was completely suppressed by this treatment.

In commercial practice, regardless of the actual concentration of the ingredients of the defoamant composition concentrate, the defoamant is introduced into the aqueous medium in controlled amounts. In general, the amount of amine that should be present in the aqueous medium, such as sewage, will be between about 0.025 and about 1 p. p. m. It will be recognized, of course, that the corresponding amount of surface active agent present will be between 0.01 and 0.05 of the weight of amine. Accordingly, it is contemplated that concentrates of the defoamant composition can be used for greater facility of transportation. Such concentrates can be diluted with a carrier at the place of use.

This application is a continuation-in-part of copending application Serial Number 257,413, filed November 20, 1951, now abandoned.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A composition for suppressing foaming in aqueous media having a pH lower than 7, which comprises between about 2 and about 50 weight percent rosin amine, between about 0.1 and about 0.5 weight percent of a nonionic surface active agent, and the balance a liquid carrier in which said rosin amine is soluble but which is substantially immiscible with water; the weight ratio of said surface active agent to said rosin amine being between about 0.01 and about 0.05.

2. A composition for suppressing foaming in aqueous media having a pH lower than 7, which comprises between about 2 and about 50 weight percent rosin amine, between about 0.1 and about 0.5 weight percent of a nonionic surface active agent having the formula

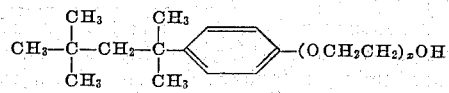

wherein x is an integer varying between 5 and 13, the weight ratio of said surface active agent to said rosin amine being between about 0.01 and about 0.05 and the balance a mineral oil having a Saybolt Universal viscosity varying between about 30 and about 100 seconds at 100° F.

3. A composition for suppressing foaming in aqueous media having a pH lower than 7, which comprises between about 2 and about 50 weight percent rosin amine, between about 0.1 and about 0.5 weight percent of a nonionic surface active agent having the formula

wherein $x$ is an integer varying between about 5 and 13, the weight ratio of said surface active agent to said rosin amine being between about 0.01 and about 0.05, between about 1 and about 50 weight percent fatty acid, and the balance a mineral oil having a Saybolt Universal viscosity varying between about 30 and about 200 seconds at 100° F.

4. A composition for suppressing foaming in aqueous media having a pH lower than 7 that comprises about 5 weight percent rosin amine, about 0.25 weight percent of a nonionic surface active agent having the formula

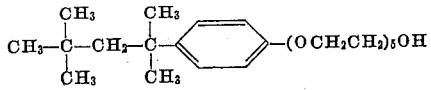

about 5 weight percent oleic acid, and the balance a mineral oil having a Saybolt Universal viscosity of about 100 seconds at 100° F.

References Cited in the file of this patent

UNITED STATES PATENTS

| | | |
|---|---|---|
| 2,400,543 | Denman | May 21, 1946 |
| 2,412,276 | Larsen | Dec. 10, 1946 |
| 2,484,010 | Bried | Oct. 11, 1949 |
| 2,490,925 | Schertz | Dec. 13, 1949 |
| 2,703,797 | Sanders | Mar. 8, 1955 |
| 2,753,309 | Figdor | July 3, 1956 |

OTHER REFERENCES

"Soap and Sanitary Chemicals," December 1947, vol. 23, pages 147, 149, and 167.

"Rosin Amine D," publication of Hercules Powder Co., 1952, page 30.

UNITED STATES PATENT OFFICE
CERTIFICATE OF CORRECTION

Patent No. 2,854,418 — September 30, 1958

Roy T. Edwards et al.

It is hereby certified that error appears in the printed specification of the above numbered patent requiring correction and that the said Letters Patent should read as corrected below.

Column 4, line 73, for "and about 100 seconds" read -- and about 200 seconds --.

Signed and sealed this 23rd day of December 1958.

(SEAL)
Attest:

KARL H. AXLINE
Attesting Officer

ROBERT C. WATSON
Commissioner of Patents